United States Patent
Onishi

(10) Patent No.: US 9,164,237 B2
(45) Date of Patent: Oct. 20, 2015

(54) COHERENT MIXER

(71) Applicant: SUMITOMO ELECTRIC INDUSTRIES, LTD., Osaka-shi, Osaka (JP)

(72) Inventor: Yutaka Onishi, Yamato (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/905,698

(22) Filed: May 30, 2013

(65) Prior Publication Data

US 2013/0330038 A1 Dec. 12, 2013

(30) Foreign Application Priority Data

Jun. 8, 2012 (JP) .................................. 2012-131071

(51) Int. Cl.
  *G02B 6/26* (2006.01)
  *G02B 6/12* (2006.01)
(52) U.S. Cl.
  CPC ............ *G02B 6/262* (2013.01); *G02B 6/12004* (2013.01); *G02B 2006/12078* (2013.01)
(58) Field of Classification Search
  USPC ......................................................... 385/31
  See application file for complete search history.

(56) References Cited

U.S. PATENT DOCUMENTS

| 2004/0096143 | A1* | 5/2004 | Shpantzer et al. | 385/16 |
| 2010/0097163 | A1* | 4/2010 | Shin et al. | 333/219 |
| 2012/0288275 | A1* | 11/2012 | Zhang et al. | 398/25 |
| 2013/0279847 | A1* | 10/2013 | Watanabe | 385/24 |
| 2014/0023314 | A1* | 1/2014 | Onishi | 385/14 |

OTHER PUBLICATIONS

R. Kunkel, et al., "First Monolithic InP-Based 90°—Hybrid OEIC Comprising Balanced Detectors for 100GE Coherent Frontends", IPRM2009, TuB2.2, pp. 167-170, 2009 IEEE.

* cited by examiner

*Primary Examiner* — Eric Wong
(74) *Attorney, Agent, or Firm* — Smith, Gambrell & Russell LLP

(57) ABSTRACT

A coherent mixer includes a substrate including a principal surface, the principal surface having a first area and a second area; a multi-mode interference device provided on the first area of the substrate; a light-receiving device provided on the second area of the substrate, the light-receiving device including a plurality of waveguide-type photodiodes; a first input waveguide optically coupled to the multi-mode interference device; a second input waveguide optically coupled to the multi-mode interference device; a plurality of optical waveguides optically coupling the multi-mode interference device to the plurality of waveguide-type photodiodes; and a protective layer covering the first and second areas of the substrate, the protective layer covering the plurality of waveguide-type photodiodes. The protective layer has an opening in the first area of the substrate. In addition, the multi-mode interference device has a surface that is at least partially exposed at the opening of the protective layer.

15 Claims, 14 Drawing Sheets

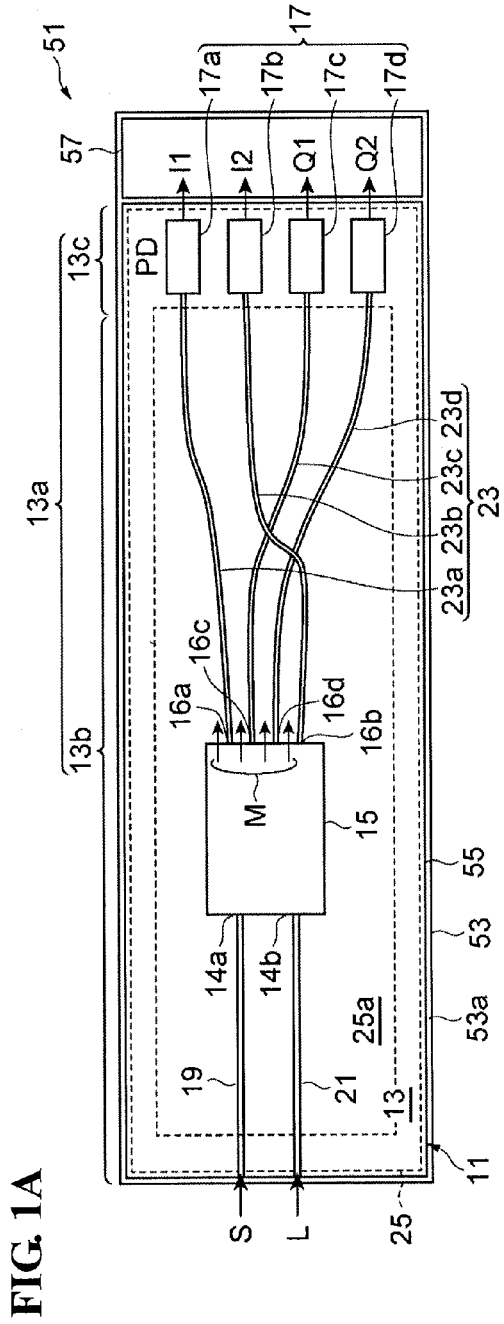
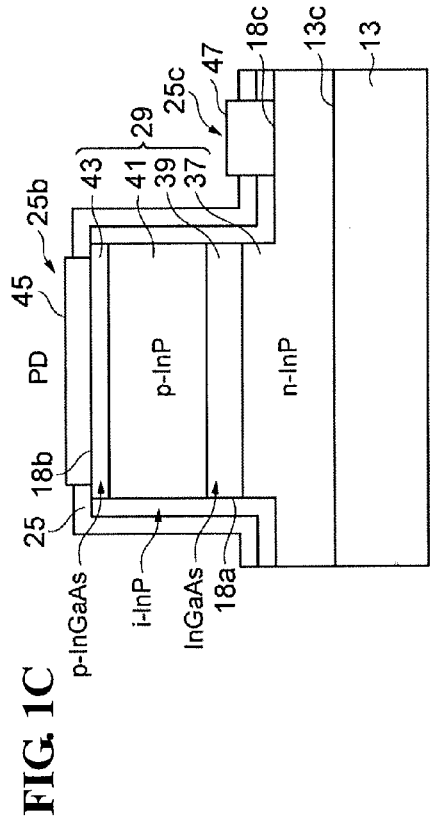
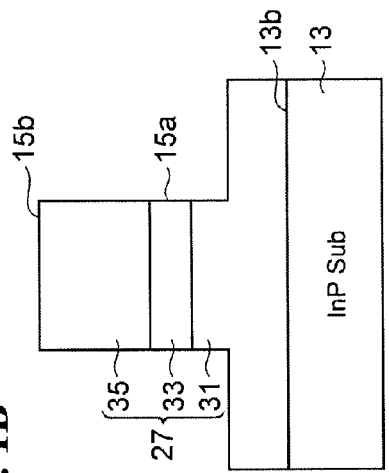
FIG. 1A
FIG. 1B
FIG. 1C

COHERENT MIXER

BACKGROUND OF THE INVENTION

1. Field of the Invention

The present invention relates to a coherent mixer.

2. Description of the Related Art

A monolithically integrated 90° hybrid is discussed in "First monolithic indium phosphide based (InP-based) 90°-hybrid opto-electronic integrated circuit (OEIC) comprising balanced detectors for 100GE coherent front ends" IPRM2009, TuB2.2 (Non-Patent Literature 1) by R. Kunkel et al. The 90° hybrid is formed of an InP-based semiconductor material. When the 90° hybrid includes a 2×2 multimode interference (MMI) coupler, in order to precisely control the phase of an optical signal, a phase shifter is included in the 90° hybrid.

SUMMARY OF THE INVENTION

In an optical receiver for a phase-modulation optical transmission system, in order to extract phase information of an optical signal, a coherent mixer for mixing a received optical signal with a local oscillator optical signal is used. The coherent mixer includes an optical waveguide formed of a compound semiconductor or a silicon semiconductor. In the phase-modulation optical transmission system, such as a quadrature phase-shift keying (QPSK) system, a 90° hybrid is used in the coherent mixer.

However, an actual coherent mixer has a larger phase deviation (phase difference between channels) and a larger imbalance (output difference between channels) as compared to their design values.

A coherent mixer according to an aspect of the present invention includes a substrate including a principal surface, the principal surface having a first area and a second area; a multi-mode interference device provided on the first area of the substrate; a light-receiving device provided on the second area of the substrate, the light-receiving device including a plurality of waveguide-type photodiodes; a first input waveguide optically coupled to the multi-mode interference device; a second input waveguide optically coupled to the multi-mode interference device; a plurality of optical waveguides optically coupling the multi-mode interference device to the plurality of waveguide-type photodiodes; and a protective layer covering the first and second areas of the substrate, the protective layer covering the plurality of waveguide-type photodiodes. The protective layer has an opening in the first area of the substrate. In addition, the multi-mode interference device has a surface that is at least partially exposed at the opening of the protective layer.

In the coherent mixer, signal light propagates through one of the first input waveguide and the second input waveguide. In addition, reference light propagates through the other of the first input waveguide and the second input waveguide. The multi-mode interference device receives the signal light and the reference light from the first input waveguide and the second input waveguide through corresponding input ports. When the signal light and the reference light are input to the multi-mode interference device, the signal light and the reference light interfere with each other in the multi-mode interference device. Then, light propagating through the multi-mode interference device is coupled to output ports of the multi-mode interference device. The light from the output ports of the multi-mode interference device has an amplitude corresponding to the phase difference between the signal light and the reference light. Output lights from the corresponding output ports are supplied to the light-receiving device through the corresponding optical waveguides. In order to obtain photo-electric conversion characteristics in the waveguide-type photodiodes, the protective layer is formed on side surfaces and a top surface of each of the waveguide-type photodiodes to cover the waveguide-type photodiodes with the protective layer.

An actual coherent mixer has characteristics of a larger imbalance and a larger phase deviation as compared to their design values. These large imbalance and large phase deviation of the coherent mixer are caused by structural deviations of an actual structure from design values. The structural deviations occur due to manufacturing variations. Specifically, the large imbalance and large phase deviation of the coherent mixer are caused from manufacturing variations in terms of film characteristics of a protective layer that covers the multi-mode interference device. In a conventional coherent mixer, the multi-mode interference device is entirely covered with a protective layer for protecting the multi-mode interference device. However, in the coherent mixer having such a structure, it is found experimentally that the imbalance and phase deviation become large. In the coherent mixer according to the present invention, an opening is formed in at least a portion of the surface of the multi-mode interference device, and the multi-mode interference device is at least partially exposed through the opening in the protective layer. This makes it possible to cause the evaluation characteristics of the coherent mixer to approach a desired imbalance and phase deviation.

In the coherent mixer according to the present invention, the multi-mode interference device may include a first cladding layer, a core layer, and a second cladding layer that are disposed in that order in a direction of a normal axis of the principal surface of the substrate. In addition, the optical waveguides, the first input waveguide, and the second input waveguide may include the core layer disposed between the first cladding layer and the second cladding layer. Further, the waveguide-type photodiodes may include a light-receiving layer.

In the coherent mixer according to the present invention, the core layer may be formed of indium gallium arsenide phosphide (InGaAsP), and the light-receiving layer of the waveguide-type photodiode may be formed of indium gallium arsenide (InGaAs).

In the coherent mixer according to the present invention, the multi-mode interference device may include at least one of a multi-mode interference type 90° hybrid and a coupler type 90° hybrid.

A multi-mode interference device including at least one of a multi-mode interference type 90° hybrid and a coupler type 90° hybrid is applicable to the coherent mixer.

In the coherent mixer according to the present invention, the multi-mode interference device may include a multi-mode interference type 90° hybrid. The multi-mode interference type 90° hybrid may have a top surface and a side surface that are at least partially exposed from the protective layer.

This coherent mixer includes a multi-mode interference device including a multi-mode interference (MMI) type 90° hybrid. When at least a portion of the top surface and a portion of a side surface of the MMI type 90° hybrid are exposed from the protective layer, it is possible for imbalance and phase deviation to approach desired values in the coherent mixer using the MMI type 90° hybrid.

In the coherent mixer according to the present invention, the multi-mode interference device may include a multi-mode interference type 90° hybrid. In addition, the multi-mode interference type 90° hybrid of the multi-mode interference device may include a multi-mode interference coupler having two input ports that are connected to the first input waveguide and the second input waveguide, respectively, and four output ports that are connected to the plurality of optical waveguides, respectively.

In the coherent mixer according to the present invention, the surface of the multi-mode interference device may be entirely exposed at the opening of the protective layer.

In the coherent mixer according to the present invention, the multi-mode interference device may include a coupler type 90° hybrid. The plurality of optical waveguides preferably include a first optical waveguide, a second optical waveguide, a third optical waveguide, and a fourth optical waveguide. In addition, the coupler type 90° hybrid of the multi-mode interference device may include a first multi-mode interference coupler that is connected to the first input waveguide, a second multi-mode interference coupler that is connected to the second input waveguide, a third multi-mode interference coupler that is connected to the first multi-mode interference coupler through a first connecting waveguide and to the second multi-mode interference coupler through a second connecting waveguide, and a fourth multi-mode interference coupler that is connected to the first multi-mode interference coupler through a third connecting waveguide and to the second multi-mode interference coupler through a fourth connecting waveguide. The third multi-mode interference coupler is preferably connected to the light-receiving device through the first and second optical waveguides. The fourth multi-mode interference coupler is preferably connected to the light-receiving device through the third and fourth optical waveguides. Furthermore, at least one of the first multi-mode interference coupler, the second multi-mode interference coupler, the third multi-mode interference coupler, and the fourth multi-mode interference coupler is preferably exposed at the opening of the protective layer.

A multi-mode interference device including a coupler type 90° hybrid is applied to the coherent mixer. When, in the coupler type 90° hybrid, at least one of the first multi-mode interference coupler to the fourth multi-mode interference coupler is exposed from the opening of the protective layer, it is possible for imbalance and phase deviation to approach desired values in the coherent mixer using the coupler type 90° hybrid.

In the coherent mixer according to the present invention, one of the first multi-mode interference coupler, the second multi-mode interference coupler, the third multi-mode interference coupler, and the fourth multi-mode interference coupler may be covered with the protective layer.

When, in the coherent mixer including the coupler type 90° hybrid, at least one of the first multi-mode interference coupler to the fourth multi-mode interference coupler is covered with the protective layer, it is possible to adjust imbalance and phase deviation in the coherent mixer using the coupler type 90° hybrid.

In the coherent mixer according to the present invention, the protective layer may be formed of silicon nitride, and the substrate may include a semi-insulating indium phosphide substrate.

A coherent mixer according to another aspect of the present invention includes a substrate including a principal surface; a multi-mode interference device provided on the principal surface of the substrate; a first input waveguide optically coupled to the multi-mode interference device; a second input waveguide optically coupled to the multi-mode interference device; a plurality of optical waveguides optically coupled to the multi-mode interference device; and a protective layer covering the substrate. The protective layer has an opening. In addition, the multi-mode interference device has a surface that is at least partially exposed at the opening of the protective layer.

BRIEF DESCRIPTION OF THE DRAWINGS

FIGS. 1A to 1C are schematic views of a coherent mixer and a coherent mixer device according to a first embodiment.

DESCRIPTION OF THE PREFERRED EMBODIMENTS

Figure 2A:
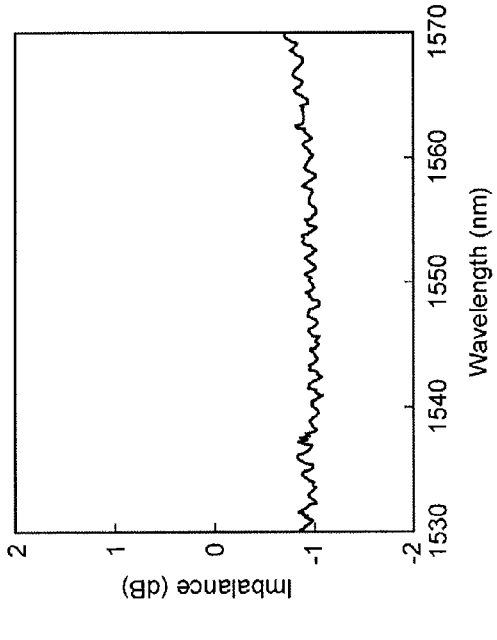
FIGS. 2A to 2E show evaluation results of the coherent mixer whose entire surface is covered with a protective layer.

A coherent mixer, a coherent mixer device, and a method of manufacturing a coherent mixer according to embodiments of the present invention are described with reference to the attached drawings. If possible, corresponding portions are given the same reference numerals.

First Embodiment

FIGS. 1A to 1C are schematic views of a coherent mixer 11 and a coherent mixer device 51 according to a first embodiment. The coherent mixer 11 includes a substrate 13, a multi-mode interference (MMI) device 15, a light-receiving device 17, a first input waveguide 19, a second input waveguide 21, an optical waveguide 23 (optical waveguides 23a, 23b, 23c, and 23d), and a protective layer 25. The substrate 13 has a principal surface 13a. The principal surface 13a has a first area 13b and a second area 13c. The multi-mode interference device 15 is provided on the first area 13b of the substrate 13. The light-receiving device 17 is provided on the second area 13c of the substrate 13. The light-receiving device 17 includes waveguide-type photodiodes 17a, 17b, 17c, and 17d. The first input waveguide 19 is optically coupled to the multi-mode interference device 15. The second input waveguide 21 is optically coupled to the multi-mode interference device 15. The multi-mode interference device 15 is optically coupled to the light-receiving device 17 through the optical waveguide 23. In the embodiment, the light-receiving device 17 includes the waveguide-type photodiodes 17a, 17b, 17c, and 17d. The waveguide-type photodiodes 17a, 17b, 17c, and 17d are optically coupled to the optical waveguides (output optical waveguides) 23a, 23b, 23c, and 23d, respectively. The protective layer 25 covers the second area 13c of the substrate 13 and the waveguide-type photodiodes 17a, 17b, 17c, and 17d. The protective layer 25 has an opening 25a in the first area 13b of the substrate 13.

As shown in FIG. 1A, at least a portion of a surface of the multi-mode interference device 15 is exposed at the opening 25a of the protective layer 25. In the embodiment, the entire surface of the multi-mode interference device 15 is exposed at the opening 25a of the protective layer 25. As shown in FIG. 1B, the multi-mode interference device 15 includes a stacked semiconductor layer 27. The multi-mode interference device 15 includes a mesa-type waveguide structure (mesa waveguide). The stacked semiconductor layer 27 includes a first cladding layer 31, a core layer 33, and a second cladding layer 35. The first cladding layer 31, the core layer 33, and the second cladding layer 35 constitute an optical waveguide in which light propagates in the core layer 33. The first cladding layer 31, the core layer 33, and the second cladding layer 35 are disposed in that order in the direction of a normal axis of the principal surface 13a of the substrate 13. In the embodiment, the optical waveguide 23, the first input waveguide 19, and the second input waveguide 21 include a mesa-type waveguide structure (mesa waveguide). In addition, the optical waveguide 23, the first input waveguide 19, and the second input waveguide 21 each include the stacked semiconductor layer 27 including the first cladding layer 31, the core layer 33, and the second cladding layer 35. The first cladding layer 31, the core layer 33, and the second cladding layer 35 are disposed in that order in the direction of the normal axis of the principal surface 13a of the substrate 13.

In the coherent mixer 11, signal light S is incident upon one of the first input waveguide 19 and the second input waveguide 21, and reference light is incident upon the other of the first input waveguide 19 and the second input waveguide 21. The multi-mode interference device 15 receives the lights S and L from the first input waveguide 19 and the second input waveguide 21 through corresponding first and second input ports 14a and 14b. The signal light S and the reference light L are input to the multi-mode interference device 15. Then, light M propagating through the multi-mode interference device 15 is coupled to output ports 16a, 16b, 16c, and 16d of the multi-mode interference device 15. The light M has an amplitude corresponding to the phase difference between the signal light S and the reference light L. Output lights from the corresponding output ports 16a, 16b, 16c, and 16d are supplied to the light-receiving device 17 through the corresponding optical waveguides 23a, 23b, 23c, and 23d. In order to obtain photo-electric conversion characteristics in the waveguide-type photodiodes 17a, 17b, 17c, and 17d, the protective layer 25 is formed on side surfaces 18a and a top surface 18b of each of the waveguide-type photodiodes 17a, 17b, 17c, and 17d.

An actual coherent mixer exhibits a larger imbalance and a larger phase deviation as compared to their design values. This is caused by structural external disturbances due to manufacturing variations. Such structural external disturbances are mainly caused by the structure of the protective layer that covers a multi-mode interference device. Hitherto, it has been thought that it is desirable to cover not only the light-receiving device, but also the multi-mode interference device with the protective layer for protecting the multi-mode interference device.

In the embodiment, however, for the coherent mixer 11 having the structure in which at least a portion of the surface of the multi-mode interference device 15 is exposed at the opening 25a of the protective layer 25, the imbalance and phase deviation of the coherent mixer within desired ranges are obtained.

As shown in FIG. 1A, the protective layer 25 has the opening 25a in the first area 13b of the substrate 13. Examples of the protective layer 25 of this type include the following.

In a first example, the entire first area 13b is exposed without being covered with the protective layer, that is, the multi-mode interference device 15, the first input waveguide 19, and the second input waveguide 21 are exposed without being covered with the protective layer. In addition, the optical waveguide 23 (optical waveguides 23a, 23b, 23c, and 23d) includes a first portion and a second portion. The first portion of the optical waveguide 23 is connected to the multi-mode interference device 15, and the second portion of the optical waveguide 23 is connected to the light-receiving device 17. The first portion of the optical waveguide 23 (optical waveguides 23a, 23b, 23c, and 23d) is not covered with the protective layer 25, and is, thus, exposed. The second portion of the optical waveguide 23 is covered with the protective layer 25, and is, thus, not exposed.

In a second example, the entire multi-mode interference device 15 in the first area 13b is exposed without being covered with the protective layer 25. Each of the first input waveguide 19 and the second input waveguide 21 includes a first portion and a second portion. The first portion of each of the first input waveguide 19 and the second input waveguide 21 includes an end portion of the coherent mixer 11 that receives input light. The second portion of each of the first input waveguide 19 and the second input waveguide 21 is connected to the multi-mode interference device 15. The first portion of each of the first input waveguide 19 and the second input waveguide 21 is covered with the protective layer 25, and is, thus, not exposed. The second portion of each of the first input waveguide 19 and the second input waveguide 21 is not covered with the protective layer 25, and is, thus, exposed. The optical waveguide 23 (optical waveguides 23a, 23b, 23c, and 23d) includes a first portion that is connected to the multi-mode interference device 15, and a second portion that is connected to the light-receiving device 17. The first portion of the optical waveguide 23 (optical waveguides 23a, 23b, 23c, and 23d) is not covered with the protective layer 25, and is, thus, exposed. The second portion of the optical waveguide 23 that is connected to the light-receiving device 17 is covered with the protective layer 25, and is, thus, not exposed.

In a third example, a portion of the multi-mode interference device 15 in the first area 13b is exposed without being covered with the protective layer 25. The remaining portion of the multi-mode interference device 15 in the first area 13b is covered with the protective layer 25, and is, thus, not exposed. The entire first input waveguide 19 and second input waveguide 21 are covered with the protective layer 25, and are, thus, not exposed. The second portion of the optical waveguide 23 that is connected to the light-receiving device 17 is covered with the protective layer 25, and is, thus, not exposed.

As shown in FIG. 1C, the waveguide-type photodiodes 17a, 17b, 17c, and 17d each include a stacked semiconductor layer 29. The waveguide-type photodiodes 17a, 17b, 17c, and 17d include a mesa structure. Each of the stacked semiconductor layer 29 includes a first cladding layer 37, a light-receiving layer 39, and a second cladding layer 41. The first cladding layer 37, the light-receiving layer 39, and the second cladding layer 41 of the stacked semiconductor layer 29 are disposed in that order in the direction of the normal axis of the principal surface 13a of the substrate 13. Each of the stacked semiconductor layer 29 may further include a contact layer 43, if necessary. An electrode 45 (such as a p-side electrode) is provided on a top surface 18b of each stacked semiconductor layer 29. An electrode 47 (such as an n-side electrode) is provided on a surface 18c of the first cladding layer 37 that is partly exposed in the stacked semiconductor layer 29. In the second area 13c, an opening 25b that is provided at the top surface 18b of the stacked semiconductor layer 29 and an opening 25c that is provided at a surface 18c of the first cladding layer 37 are formed in the protective layer 25.

The side surfaces 18a and the top surface 18b of the stacked semiconductor layer 29 is covered with the protective layer 25. If necessary, it is desirable that the top surface 18b and the side surfaces 18a of the stacked semiconductor layer 29 be covered with a non-doped semiconductor layer (i-type semiconductor layer). Even in this case, similarly to the protective layer 25, the non-doped semiconductor layer has an opening 25b that is provided at the top surface 18b of the stacked semiconductor layer 29, and an opening 25c that is provided at the partly exposed surface 18c of the cladding layer 37. Each of the electrodes 45 is in contact with its corresponding second cladding layer 41 (its corresponding contact layer 43 in the embodiment) through its corresponding opening 25b. In contrast, each of electrodes 47 is in contact with its corresponding first cladding layer 37 through its corresponding opening 25c.

In the coherent mixer 11, the multi-mode interference device 15 includes at least one of a MMI type 90° hybrid having a 2×4 MMI structure (hereinafter, denoted as the "MMI type 90° hybrid") and a coupler type 90° hybrid having, for example, four 2×2 MMI couplers (hereinafter, denoted as the "coupler type 90° hybrid"). These structures can be manufactured by performing the steps of a method of manufacturing a semiconductor device related to a compound semiconductor (such as epitaxial growth, photolithography, etching, and chemical vapor deposition (CVD) of an insulating layer).

Referring to FIG. 1A, the coherent mixer device 51 includes the coherent mixer 11, a submount 53, and a solder material 55. The coherent mixer 11 is mounted on a principal surface 53a of the submount 53. The coherent mixer 11 and the submount 53 are joined to each other using the solder material 55.

In the coherent mixer device 51, when the submount 53 is joined using the solder material 55, thermal stress is applied to the coherent mixer 11. According to the coherent mixer device 51, even if thermal stress is applied to the coherent mixer 11 when the coherent mixer 11 is mounted on the submount 53, imbalance and phase deviation can be reduced so as to be within desired ranges.

In the coherent mixer 11, the waveguide-type photodiodes 17a, 17b, 17c, and 17d output current signals I1, I2, Q1, and Q2, respectively. These current signals are supplied to a signal processing circuit 57 through electric wires. The current signals I1, I2, Q1, and Q2 each have an amplitude corresponding to the phase difference between the signal light S and the reference light L. On the basis of these signals, the signal processing circuit 57 generates a signal (I1-I2) for demodulation and a complex signal thereof (Q1-Q2). In order to facilitate the generation of these signals (I1, I2, Q1, and Q2), in the coherent mixer 11, the optical waveguide 23 is crossed.

Figure 2B:
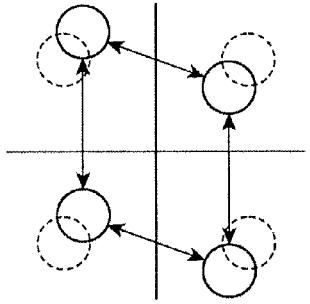

FIGS. 2A to 2E show evaluation results of the coherent mixer 11 whose entire surface is covered with the protective layer (silicon nitride (SiN) layer) 25. FIG. 2A shows phase deviation (vertical axis) in a wavelength range of 1530 nm to 1570 nm. FIG. 2B shows imbalance (vertical axis) in the wavelength range of 1530 nm to 1570 nm. This wavelength range includes a C-band (1530 nm to 1565 nm) that is an important wavelength range for optical fiber communication systems.

When the coherent mixer 11 includes a MMI type 90° hybrid as the multi-mode interference device 15, ideally, signal light that has been input from the first input port 14a and a local oscillator optical signal that has been input from the second input port 14b propagate through the multi-mode interference device 15 and interfere with each other. Output lights M are coupled to the four output ports 16a, 16b, 16c, and 16d of the multi-mode interference device 15. Phases of the output lights M are shifted by 90 degrees at the four output ports 16a, 16b, 16c, and 16d. The output lights M are output from the output ports 16a, 16b, 16c, and 16d, respectively. In accordance with the phase difference between the signal light S and the local oscillator optical signal L, the intensities of the output lights M from the MMI type 90° hybrid change at the four output ports of the MMI type 90° hybrid, respectively. Therefore, the MMI type 90° hybrid is capable of converting phase information of the signal light into intensity information. The output lights M are received by the photodiodes.

Figure 2C:
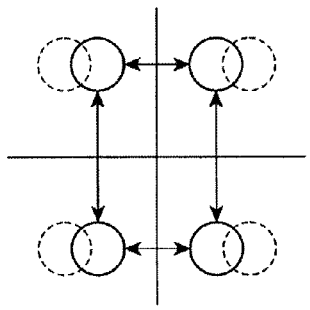
Figure 2D:
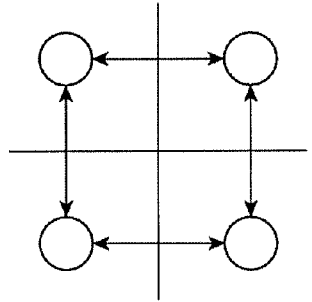
Figure 2E:
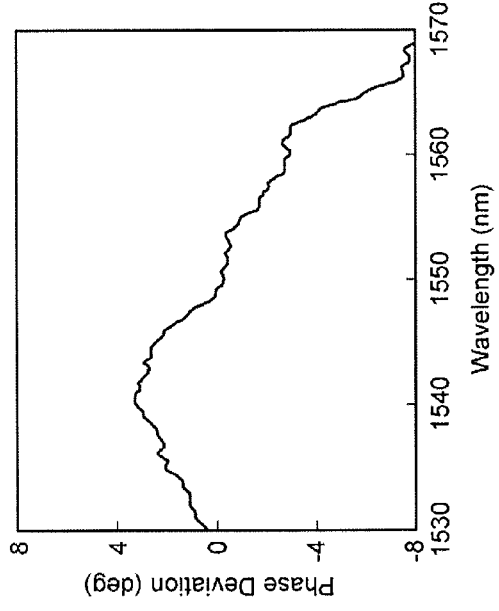

However, when a MMI type 90° hybrid includes a structure that deviates from an ideal structure, it becomes difficult to precisely convert the phase difference between the signal light and the local oscillator optical signal into light intensity. As a result, a reduction in receiver sensitivity and crosstalk of the signal light occur. As shown in FIG. 2C, when an ideal quadrature phase-shift keying (QPSK) signal is received, a constellation of QPSK modulation is such that symbols are at equal intervals and that distances between a coordinate center and the symbols become equal to each other. When, in the constellation of QPSK modulation, the symbols are positioned away from each coordinate axis, the receiver sensitivity is good. FIGS. 2C, 2D, and 2E show constellations including the symbols when QPSK modulation signals are modulated. In the constellation, the horizontal axis represents the amplitude of the modulated signals, and the vertical axis represents the phase angle of the modulated signals. FIG. 2C shows the constellation when an imbalance value and a phase angle value of the modulated signals are proper values. When imbalance and phase deviation occur between the modulated signals (channels), as shown in FIGS. 2D and 2E, each symbol is displaced from its ideal position, and the distances between the symbols become nonuniform. When the constellation of QPSK modulation is as shown in FIGS. 2D and 2E, the receiver sensitivity of an optical receiver that is composed of a coherent mixer including a MMI type 90° hybrid is reduced.

Referring again to FIG. 2D, when imbalance occurs in the modulated signals, the symbols in the constellation are displaced along the vertical axis. Referring to FIG. 2E, when phase deviation occurs in the modulated signals, the symbols in the constellation are displaced along the horizontal axis. These constellation characteristics can be obtained by measuring electrical signals from the photodiodes of the coherent mixer 11.

The coherent mixer according to the embodiment is subsequently described with reference to the results of evaluations of characteristics thereof. A coherent mixer having the following structure is provided or manufactured, referring to such evaluations.

In an exemplary coherent mixer 11, a protective layer 25 is formed of, for example, silicon nitride. A substrate 13 includes a semi-insulating indium phosphide (InP) substrate. Core layers of optical waveguides are formed of indium gallium arsenide phosphide (InGaAsP). Light-receiving layers 39 of the waveguide-type photodiodes 17 are formed of indium gallium arsenide (InGaAs). When the coherent mixer 11 has the above-described structure, imbalance and phase deviation vary. In addition, imbalance values and phase deviation values are adjustable in the coherent mixer.

An exemplary waveguide structure is as follows: (1) mesa-type waveguide structure; (2) substrate 13: semi-insulating InP substrate; (3) first cladding layer 31: non-doped InP layer (thickness of 1.2 µm); (4) core layer 33: non-doped InGaAsP layer (thickness of 0.5 µm, bandgap wavelength λg=1.05 µm); (5) second cladding layer 35: non-doped InP layer (thickness of 1.0 µm); (6) the first cladding layer 31, the core layer 33, and the second cladding layer 35 are formed on the substrate 13 by epitaxial growth; (7) width of mesa waveguide: 2.5 µm; and (8) height of mesa waveguide: 2.3 µm.

An exemplary MMI structure is as follows: (1) the layer structure is the same as that of the waveguide; (2) width of the MMI structure: 20 µm; (3) length of the MMI structure: 806 µm; and (4) mesa height of the MMI structure: 2.3 µm.

An exemplary photodiode (PD) structure is as follows: (1) substrate 13: semi-insulating InP layer; (2) first cladding layer 37: n-type InP layer (thickness of 1.2 µm, impurity concentration of $5\times10^{18}$ cm$^{-3}$); (3) light-receiving layer 39: non-doped InGaAs absorber layer (thickness of 0.5 µm); (4) second cladding layer 41: p-type InP layer (thickness of 0.7 µm, impurity concentration of $7\times10^{17}$ cm$^{-3}$); (5) contact layer 43: p-type InGaAs layer (thickness of 0.3 µm, impurity concentration of $1\times10^{19}$ cm$^{-3}$); (6) the first cladding layer 37, the light-receiving layer 39, the second cladding layer 41, and the contact layer are formed by epitaxial growth; (7) buried layer: non-doped InP protective layer (0.3 µm); (8) the buried layer is formed at a side surface of a mesa structure by epitaxial growth; (9) PD width: 12 µm; PD length: 12 µm; (10) PD mesa height: 2.0 µm; (11) p-side electrode 45; (12) n-side electrode 47; (13) protective layer 25: SiN protective layer (thickness of 500 nm); and (14) in order to suppress damage to the waveguides during processing after manufacturing a semiconductor device, and in order to ensure reliability and insulating performance of PDs, the SiN protective layer having a thickness of 500 nm (desirably a thickness in the range of 100 nm to 1000 nm) is deposited.

FIGS. 2A and 2B show, respectively, phase deviation and imbalance between the I1 channel and the I2 channel when light L is incident from the input port. In FIGS. 2A and 2B, the maximum phase deviation is −8 degrees and the maximum imbalance is −1 dB in the wavelength range of 1530 nm to 1570 nm. The phase deviation and the imbalance are theoretically 0 degrees and 0 dB, respectively. However, the refractive index distribution of the MMI structure is no longer uniform because of the stress of the insulating layer (SiN layer) used as the protective layer. It is thought that, as a result, phase deviation and imbalance occur because the interference of lights in the MMI structure is no longer in an ideal state.

In the coherent mixer 11, the multi-mode interference device 15 includes a MMI type 90° hybrid. It is desirable that, for example, at least a portion of each side surface and a portion of the top surface of the MMI type 90° hybrid are exposed from a protective layer 24. Thus, the top surface and the side surface of the MMI type 90° hybrid are partially or entirely exposed from the protective layer.

When, in the MMI type 90° hybrid, at least a portion of each side surface 15a and a portion of the top surface 15b are exposed from the protective layer, it is possible for the imbalance and phase deviation to approach desired values in the coherent mixer 11 using the MMI type 90° hybrid.

Figure 3:
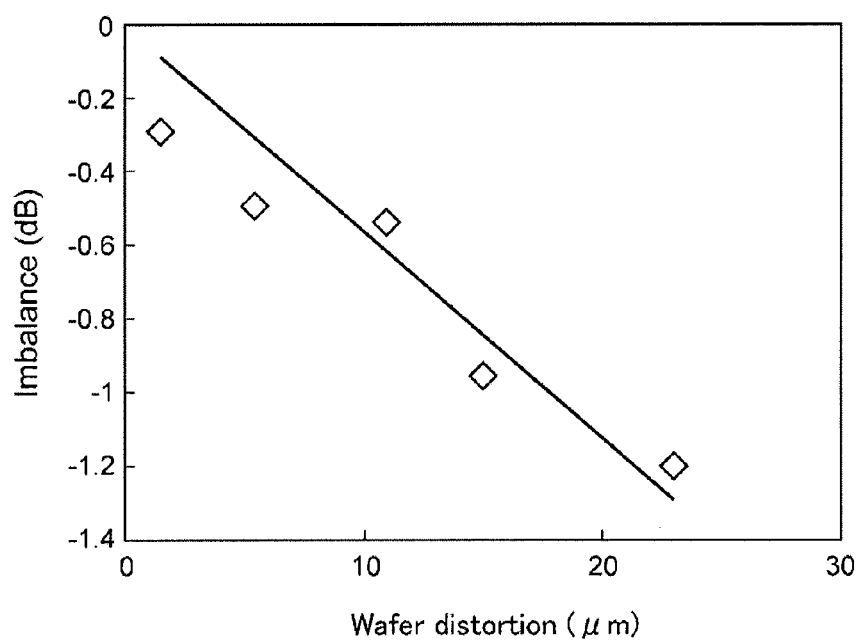
FIG. 3 shows the relationship between substrate product (wafer) distortion and imbalance of the coherent mixer on the substrate product.

FIG. 3 shows the relationship between substrate product (wafer) distortion and imbalance of the coherent mixer on the substrate product. The substrate product is formed for manufacturing the coherent mixer 11. FIG. 3 shows that characteristics of the coherent mixer, such as imbalance and phase deviation, are related to stress that is generated in the MMI type 90° hybrid as a result of the wafer distortion. The stress that is generated in the MMI type 90° hybrid changes the refractive index of the MMI type 90° hybrid. The phase deviation and imbalance occur due to the change of the refractive index of the MMI type 90° hybrid.

In FIG. 3, the wafer distortion amount (the wafer being, for example, a 3-inch wafer) is intentionally changed by changing the material and thickness of the protective layer. SiN, silicon oxynitride (SiON), and silicon dioxide ($SiO_2$) are used as an insulating layer (protective layer) that protect and cover the coherent mixer. These SiN film, silicon oxynitride (SiON) film, and silicon dioxide ($SiO_2$) film have different stresses from each other even if these films have the same thickness. In addition, a film stress depends on its thickness. As the film thickness increases, the film stress increases. Therefore, the wafer distortion amount is changed by changing the material and thickness of the protective layer. Here, the distortion amount is defined as the difference between the height of the outer periphery of the wafer (that is, 2 mm from an edge of the wafer) and the height of the center of the wafer. The distortion amount of the wafer is proportional to the stress in the wafer. Therefore, by measuring the distortion amount of the wafer, a value of the stress in the wafer is obtained. The horizontal axis in FIG. 3 can be read as the stress that is applied to the MMI structure. FIG. 3 shows that, as the stress on the MMI structure is reduced, the imbalance tends to be reduced. In addition, FIG. 3 shows that, when the wafer distortion is zero, that is, when no insulating layer is formed on at least the MMI type 90° hybrid in the coherent mixer, the imbalance of the MMI structure is almost eliminated.

First Example

Figure 4A:
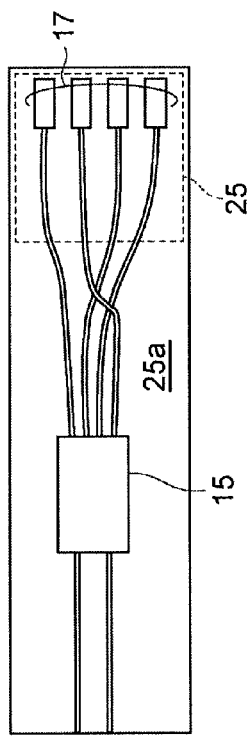
FIG. 4A shows a structure of a coherent mixer according to an example.
Figure 4B:
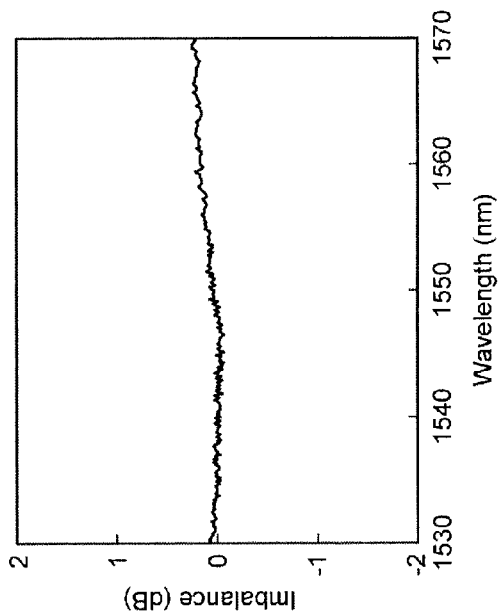
FIGS. 4B and 4C show characteristics of the coherent mixer according to the example.
Figure 4C:
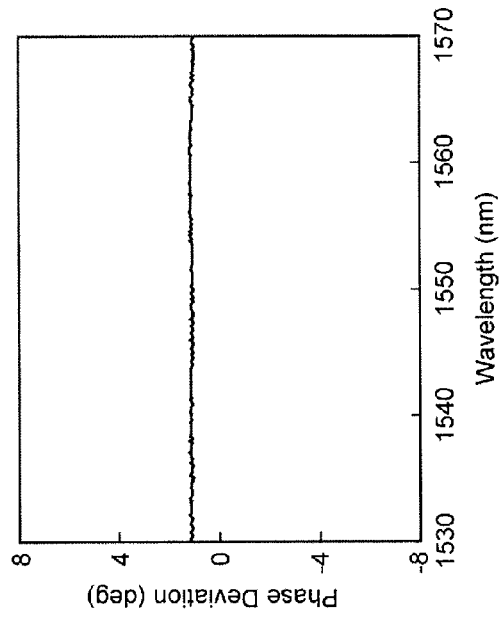

On the basis of this observation, as shown in FIG. 4A, photodiodes of the coherent mixer are selectively covered with a SiN layer having a thickness of 500 nm. In conformity with this, the SiN layer is partly removed so that a multi-mode interference device (that is, devices other than the photodiodes) is selectively not covered with the SiN layer, to expose the multi-mode interference device. FIGS. 4B and 4C show phase deviation and imbalance between the I1 channel and the I2 channel when light L is incident from the input port. The maximum phase deviation value is 1.4 degrees, and the maximum imbalance value is on the order of 0.25 dB. These are substantially allowable ranges, and are very close to ideal values. In the multi-mode interference device (that is, the devices other than the photodiodes), stress generated by the SiN layer no longer exists. Therefore, the refractive index distribution of a MMI structure does not change. The uniformity of the refractive index distribution of a MMI structure is increased. This shows that, in order to stabilize the MMI characteristics, it is effective not to provide a protective layer on the MMI structure. In contrast, in order to ensure reliability and insulating performance of the photodiodes, a protective layer is formed on the photodiodes.

Second Example

Figure 5A:
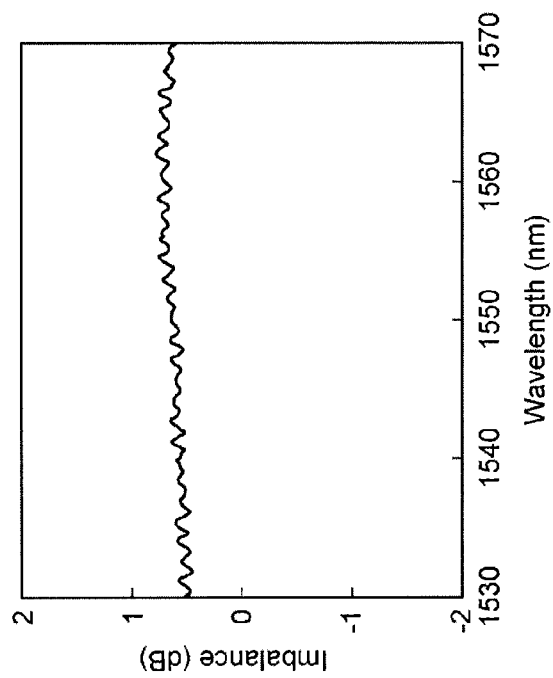
FIGS. 5A and 5B show characteristics of a coherent mixer according to an example.
Figure 5B:
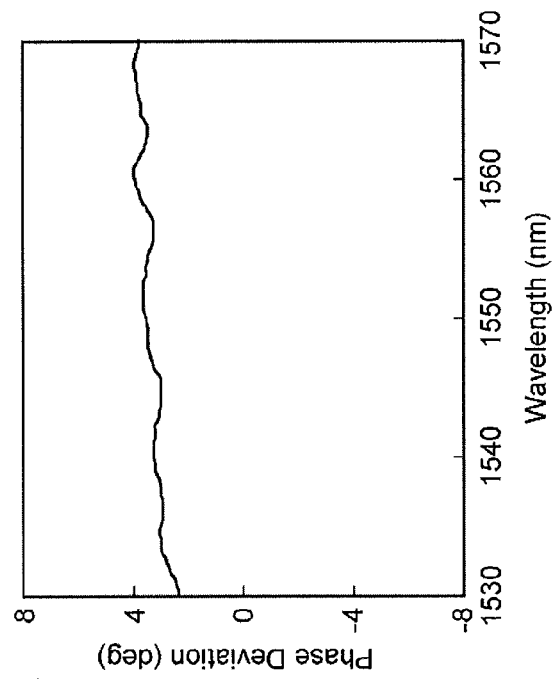

The coherent mixer in the first example is mounted to an aluminum nitride (AlN) submount using gold-tin (AuSn) solder, to manufacture a coherent mixer device. As in the first example, phase deviation and imbalance are evaluated. FIGS. 5A and 5B show the evaluation results of phase deviation and imbalance in the coherent mixer device. The phase deviation of the coherent mixer device is 4 degrees, and the imbalance of the coherent mixer device is 0.7 dB.

Third Example

Figure 6A:
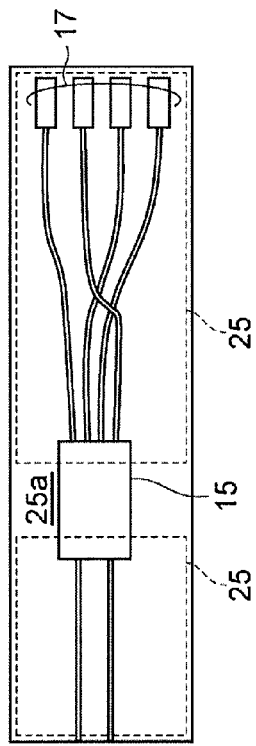
FIG. 6A shows a structure of a coherent mixer according to an example.
Figure 6B:
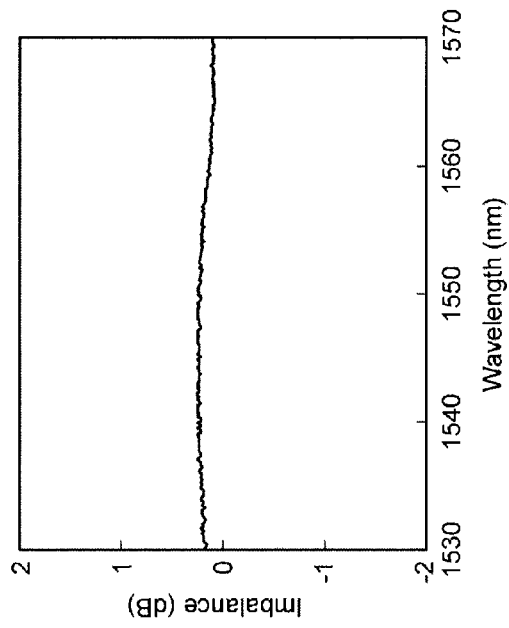
FIGS. 6B and 6C show characteristics of the coherent mixer according to the example.
Figure 6C:
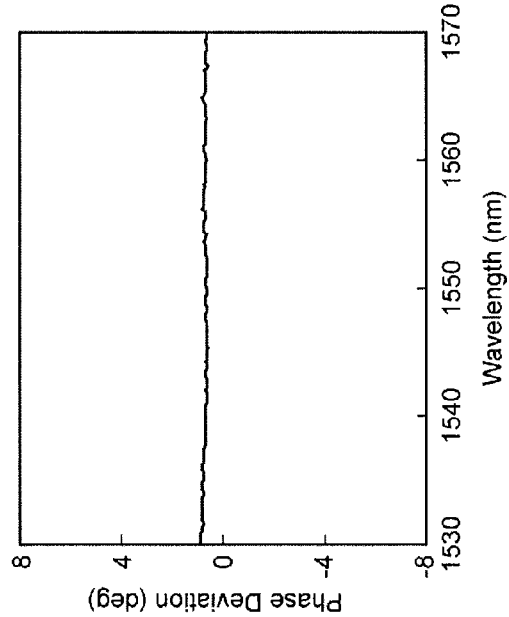

As shown in FIG. 6A, a coherent mixer in which a portion of a SiN layer of a MMI portion of the coherent mixer is removed is formed. The MMI portion includes a first portion, a second portion, and a third portion, which are disposed in the direction from input ports to output ports. The first portion includes the input ports, and the third portion includes the output ports. The second portion is not covered with the SiN layer. The coherent mixer is mounted to an AlN submount using AuSn solder, to manufacture a coherent mixer device. FIGS. 6B and 6C show characteristics of the coherent mixer device having this structure. The characteristics are improved, so that the phase deviation is not more than 1 degree, and the imbalance is 0.25 dB.

Figure 7A:
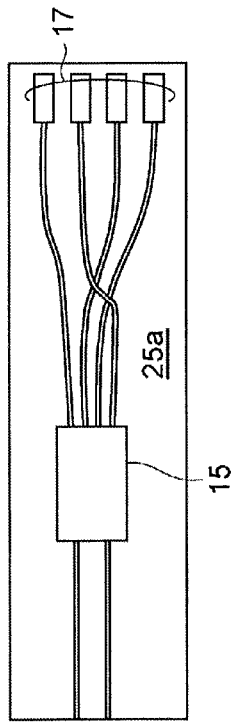
FIG. 7A shows a structure of a coherent mixer according to an example.
Figure 7B:
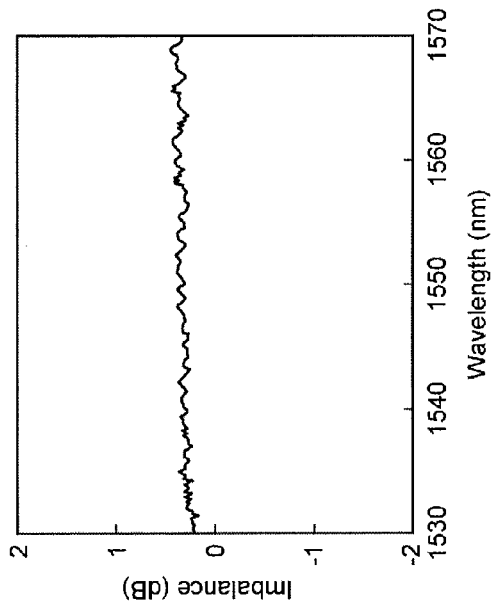
FIGS. 7B and 7C show characteristics of the coherent mixer according to the example.
Figure 7C:
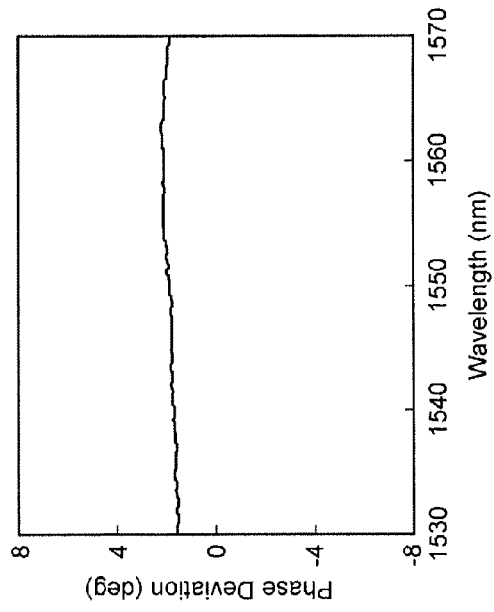

Next, as shown in FIG. 7A, after removing all of the SiN layer of the MMI portion of the coherent mixer, the characteristics of the coherent mixer device are evaluated. FIGS. 7B and 7C show characteristics of the coherent mixer device having this structure. The phase deviation is not more than 2 degrees, and the imbalance is 0.4 dB.

Thermal stress is applied to the MMI portion of the coherent mixer when the coherent mixer device is mounted on, for example, an AlN submount using a solder. The stress changes the MMI characteristics. In the first example, if all of the SiN layer on the MMI portion is removed, it is possible for the phase and imbalance to approach an ideal phase and imbalance. In the second example, it is highly effective when a portion of the SiN layer on the MMI portion is removed. As a result, it is understood that improvements in the MMI characteristics depend upon the distribution of stress on the MMI portion.

Second Embodiment

In a coherent mixer 11, a multi-mode interference device 15 may include a coupler type 90° hybrid.

Figure 8:
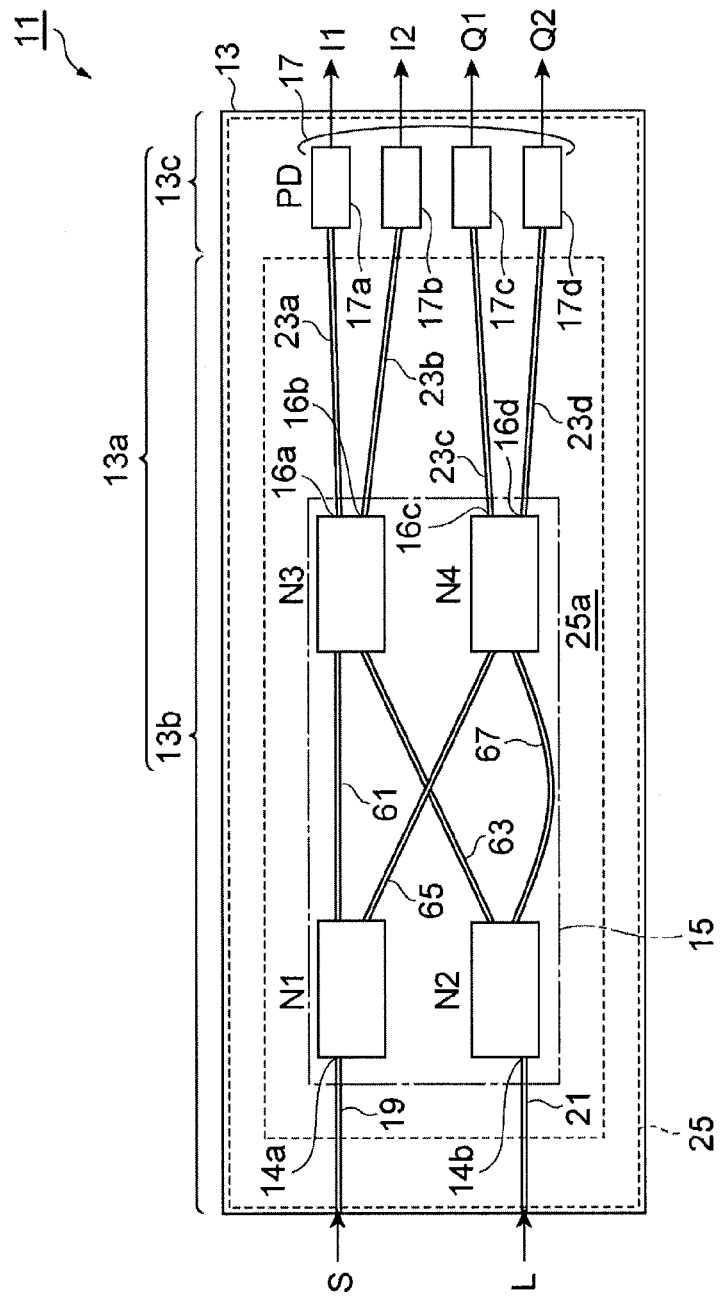
FIG. 8 is a schematic view of a coherent mixer and a coherent mixer device according to a second embodiment.

FIG. 8 is a schematic view of the coherent mixer 11 including a coupler type 90° hybrid. In the coherent mixer 11, the coupler type 90° hybrid of the multi-mode interference device 15 includes four 2×2 MMI couplers, that is, a first MMI coupler (N1), a second MMI coupler (N2), a third MMI coupler (N3), and a fourth MMI coupler (N4). The first MMI coupler (N1) is connected to a first input waveguide 19. The second MMI coupler (N2) is connected to a second input waveguide 21. The third MMI coupler (N3) is connected to a first connecting waveguide 61 and a second connecting waveguide 63. The fourth MMI coupler (N4) is connected to a third connecting waveguide 65 and a fourth connecting waveguide 67. The third MMI coupler (N3) is connected to the first MMI coupler (N1) through the first connecting waveguide 61, and to the second MMI coupler (N2) through the second connecting waveguide 63. The fourth MMI coupler (N4) is connected to the first MMI coupler (N1) through the third connecting waveguide 65, and to the second MMI coupler (N2) through the fourth connecting waveguide 67. The third MMI coupler (N3) is connected to a light-receiving device 17 through optical waveguides 23a and 23b among optical waveguides 23a to 23d. The fourth MMI coupler (N4) is connected to the light-receiving device 17 through the other optical waveguides 23c and 23d among the optical waveguides 23a to 23d.

In the first MMI coupler (N1), signal light S is divided into the first connecting waveguide 61 and the third connecting waveguide 65. In the second MMI coupler (N2), reference light L is divided into the second connecting waveguide 63 and the fourth connecting waveguide 67. The signal light S from the first MMI coupler (N1) and the reference light L from the second MMI coupler (N2) are input to the third MMI coupler (N3). At the third MMI coupler (N3), these lights S and L are multiplexed and interfere with each other. From output ports 16a and 16b, these lights S and L are output as a pair of interference lights. One of these interference lights is supplied to a photodiode 17a, and the other interference light is supplied to a photodiode 17b. The signal light S from the first MMI coupler (N1) and the reference light L from the second MMI coupler (N2) are input to the fourth MMI coupler (N4). At the fourth MMI coupler (N4), these lights S and L are multiplexed and interfere with each other. From output ports 16c and 16d, these lights S and L are output as a pair of interference lights. One of these interference lights is supplied to a photodiode 17c, and the other interference light is supplied to a photodiode 17d.

At least one of the first MMI coupler (N1), the second MMI coupler (N2), the third MMI coupler (N3), and the fourth MMI coupler (N4) may be exposed at an opening 25a of a protective layer 25.

The coherent mixer 11 is applicable to the multi-mode interference device 15 including the coupler type 90° hybrid. When, in the coupler type 90° hybrid, at least one of the first MMI coupler (N1) to the fourth MMI coupler (N4) is exposed at the opening 25a of the protective layer 25, it is possible for the imbalance and the phase deviation to approach desired values in the coherent mixer 11 using the coupler type 90° hybrid.

In the coherent mixer 11 according to the second embodiment, at least one of the first MMI coupler (N1), the second MMI coupler (N2), the third MMI coupler (N3), and the fourth MMI coupler (N4) may be covered with the protective layer 25. When, in the coherent mixer 11 including the coupler type 90° hybrid, at least one of the first MMI coupler (N1) to the fourth MMI coupler (N4) is covered with the protective layer 25, it is possible to adjust the imbalance and phase deviation in the coherent mixer 11 using the coupler type 90° hybrid.

Fourth Example

FIG. 8 shows the coherent mixer in which the PDs and the coupler type 90° hybrid are integrated. As in the first embodiment, in the coupler type 90° hybrid, a signal light S and a local oscillator optical signal L are coupled so that the phases of lights at the four output ports are shifted by 90 degrees, respectively. The signal light S and the local oscillator optical signal L are provided to the input ports of the coupler type 90° hybrid. The output lights from the coupler type 90° hybrid are supplied to each PD. The PDs generate electrical signals I1, I2, Q1, and Q2, respectively. In accordance with the phase difference between the signal light S and the local oscillator optical signal L, the intensities of the output lights from the coupler type 90° hybrid change at the four output ports of the coupler type 90° hybrid, respectively. Therefore, phase information of the signal light is converted into intensity information. It is possible for the PDs to receive these signals and perform photo-electric conversion.

The structures of the waveguides and the PDs are the same as those of the waveguides and the PDs according to the first embodiment. In order to suppress damage to the waveguides during processing, and obtain highly-reliable PDs, a SiN layer having a thickness of 500 nm is deposited on the coherent mixer.

An exemplary 2×2 MMI structure is as follows: (1) a layer structure is the same as that of each waveguide according to the first embodiment; (2) width of the 2×2 MMI structure: 6 µm; (3) length of the 2×2 MMI structure: 158 µm; and (4) mesa height of the 2×2 MMI structure: 2.3 µm.

Figure 9A:
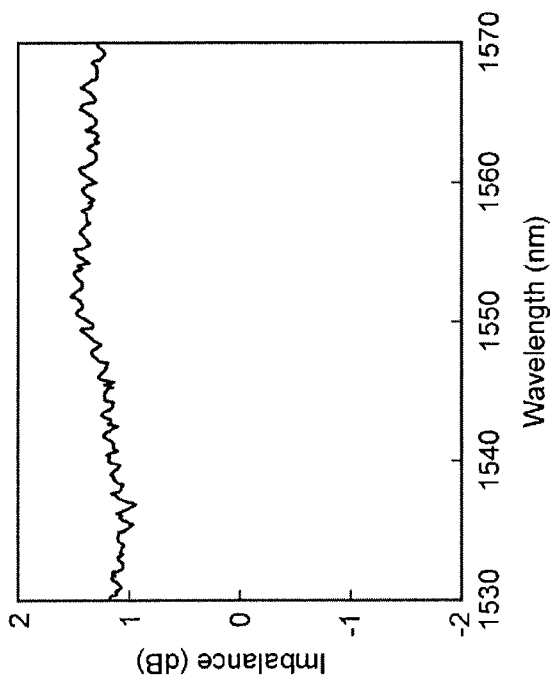
FIGS. 9A and 9B show characteristics of a coherent mixer according to an experimental example.
Figure 9B:
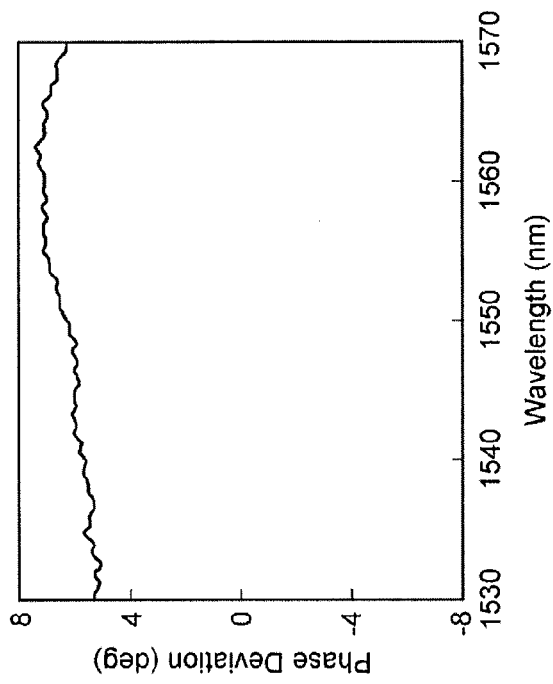

FIGS. 9A and 9B show, respectively, the phase deviation and the imbalance between the I1 channel and the I2 channel for the coherent mixer in which the coupler type 90° hybrid has been entirely covered with a SiN layer. Referring to FIGS. 9A and 9B, the maximum phase deviation value is 7.3 degrees, and the maximum imbalance value is 1.5 dB in the wavelength range between 1530 nm to 1570 nm. The ideal phase deviation value and imbalance value are 0 degrees and 0 dB, respectively. However, the refractive index distribution of the MMI structure is no longer uniform because of the stress of the insulating layer. The non-uniform refractive index distribution causes light interference in the MMI structure to change. This is thought to cause phase deviation and imbalance.

Figure 10A:
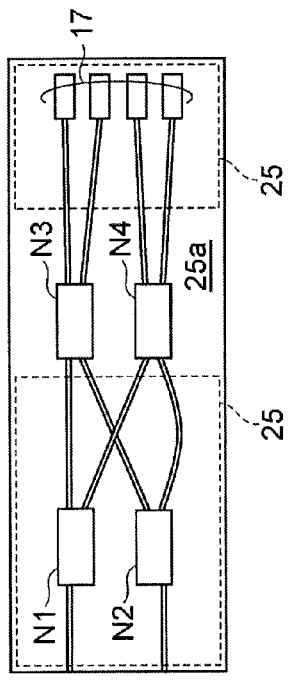
FIG. 10A shows a structure of a coherent mixer according to an example.

As shown in FIG. 10A, the SiN layer (protective layer 25) of the coherent mixer covers all of the photodiodes and the first and second MMI couplers (N1, N2). The SiN layer has an opening (opening 25a of the protective layer 25) that is provided so as not to cover the third and fourth MMI couplers (N3, N4).

Figure 10B:
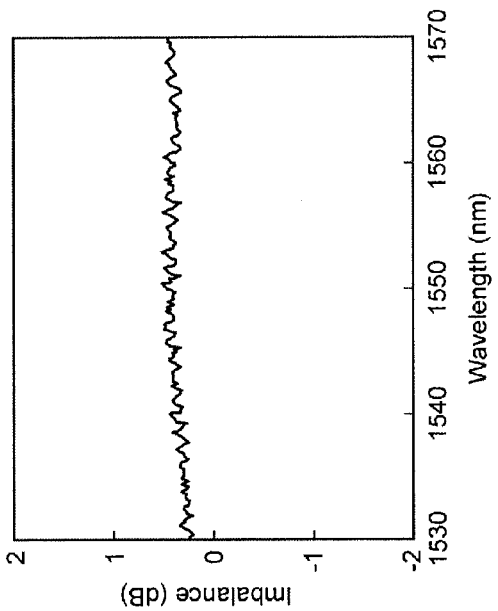
FIGS. 10B and 10C show characteristics of the coherent mixer according to the example.
Figure 10C:
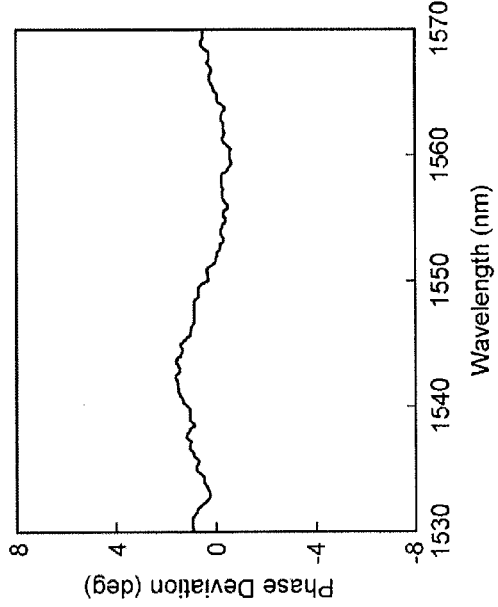

FIGS. 10B and 10C show the results of measurements of phase deviation and imbalance of the coherent mixer in which the SiN layer has the opening 25a of the protective layer 25. In the embodiment, the protective layer 25 is provided on the first and second MMI couplers (N1, N2). In addition, the protective layer 25 is not provided on the third and fourth MMI couplers (N3, N4). The maximum phase deviation value is 1.7 degrees, and the maximum imbalance value is 0.5 dB. In the embodiment, a portion of the multi-mode interference device, that is the MMI couplers (N3, N4), is not subjected to stress by the SiN layer. Therefore, the uniformity of the refractive index distribution of the MMI structure is increased.

Figure 11A:
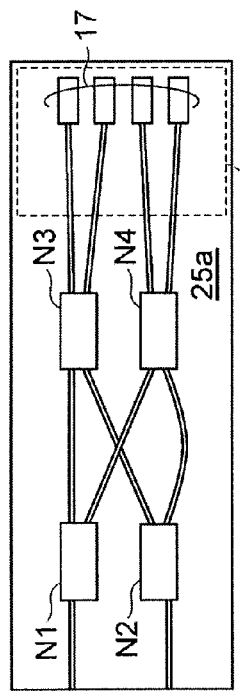
FIG. 11A shows a structure of a coherent mixer according to an example.

As shown in FIG. 11A, a SiN layer (protective layer 25) of a coherent mixer has an opening (opening 25a of a protective layer 25) that is provided so that all photodiodes are covered and so that first to fourth MMI couplers (N1, N2, N3, N4) are not covered.

Figure 11C:
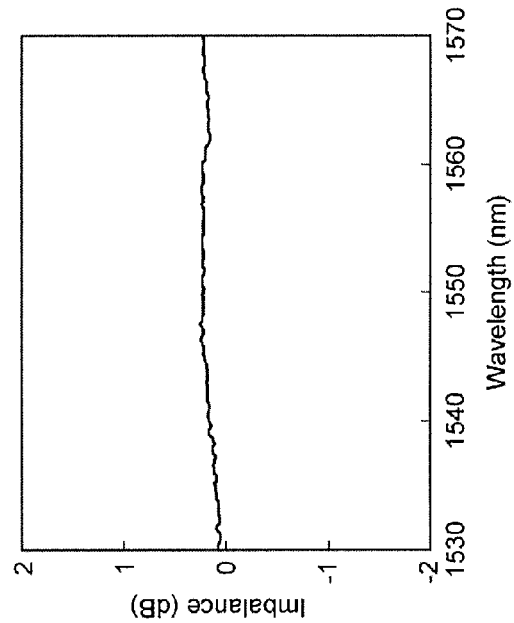
FIGS. 11B and 11C show characteristics of the coherent mixer according to the example.
Figure 11B:
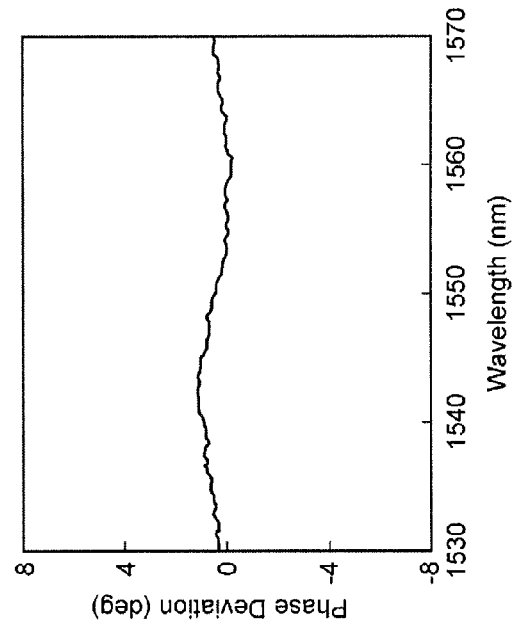

FIGS. 11B and 11C show the results of measurements of phase deviation and imbalance of the coherent mixer in which the SiN layer is not provided on the MMI couplers (N1, N2, N3, N4). Comparing FIGS. 11B and 11C with FIGS. 10B and 10C, when the area of the opening 25a of the protective layer 25 is increased, the phase deviation and the imbalance are both slightly reduced. However, there are almost no differences in terms of phase deviation and imbalance between these two coherent mixers. Therefore, in such a coherent mixer, the stress of the insulating layer on the last two MMI couplers among the four MMI couplers is large and/or the change in the refractive indices of the last two MMI couplers greatly influence the interference between the signal light S and the local oscillator optical signal L. As a result, the example is not limited to removal of a SiN layer from all of the MMI couplers of the 90° hybrid.

As mentioned above, it is possible to adjust the phase deviation and imbalance by removing the SiN layer on all or some of the parts of the coherent mixer. Although, here, a SiN layer is used as a protective layer, for example, a silicon-based inorganic insulating layer (such as $SiO_2$ or SiON) or resin (such as polyimide resin or benzocyclobutene (BCB) resin) may be used as a protective layer. It is possible to similarly adjust phase deviation and imbalance in accordance with the stress in the protective layer. In the embodiment, the coherent mixer whose photodiodes are integrated is described. However, similar effects can be expected even for a coherent mixer whose photodiodes are not integrated.

Figure 12:
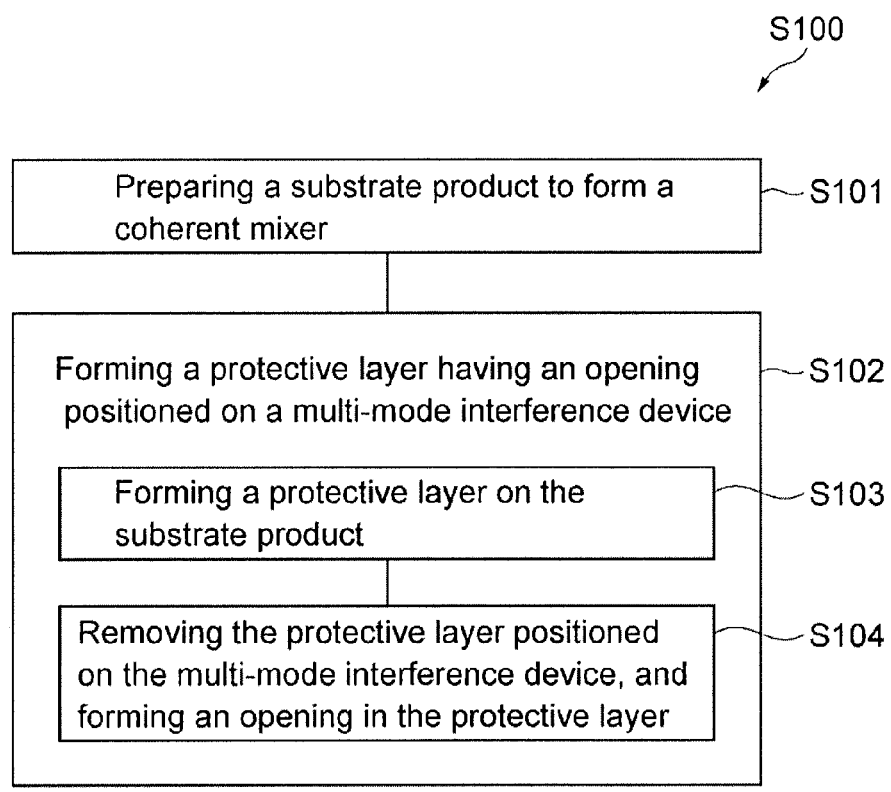
FIG. 12 shows the main steps of a method of manufacturing a coherent mixer.

FIG. 12 shows the main steps of a method of manufacturing a coherent mixer 11. In the subsequent description, corresponding devices are indicated using the same reference numerals as those used in, for example, FIGS. 1A to 2E. In Step S101, a substrate product is provided. The substrate product includes a substrate 13 and a multi-mode interference device 15. A principal surface 13a of the substrate 13 includes a first area 13b and a second area 13c. The multi-mode interference device 15 is provided on the first area 13b of the substrate 13, and is formed of a III-V group compound semiconductor. A multi-mode interference device including at least one of a MMI type 90° hybrid and a coupler type 90° hybrid is applied to the coherent mixer 11. These structures may be formed by carrying out the steps of the method of manufacturing a semiconductor device related to a compound semiconductor (such as epitaxial growth by a metal organic chemical vapor deposition (MOCVD) method, photolithography, etching, and chemical vapor deposition (CVD) of an insulating layer).

If necessary, the substrate product may include a light-receiving device 17. The light-receiving device 17 includes a plurality of waveguide-type photodiodes 17a to 17d. The light-receiving device 17 is provided on the second area 13c of the substrate 13. The substrate product may also include a first input waveguide 19, a second input waveguide 21, and a plurality of optical waveguides 23. The first input waveguide 19 is optically coupled to the multi-mode interference device 15, and is formed of a III-V group compound semiconductor. The second input waveguide 21 is coupled to the multi-mode interference device 15, and is formed of a III-V group compound semiconductor. The optical waveguides 23a to 23d optically couple the multi-mode interference device to the plurality of waveguide-type photodiodes 17a to 17d.

In Step S102, a protective layer 25 having an opening 25a positioned on the multi-mode interference device 15 is formed. First, in Step S103, the protective layer is formed on an entire surface of the substrate product. Then, the protective layer is processed (by, for example, etching) in Step S104, so that the protective layer covers the second area 13c of the substrate 13, and the opening 25a that is positioned in the first area 13b of the substrate 13 is formed in the protective layer. As a result, the protective layer 25 having the opening 25a positioned on the multi-mode interference device 15 is formed. At least a portion of the surface of the multi-mode interference device 15 is exposed at the opening 25a of the protective layer 25. The multi-mode interference device 15 includes a stacked semiconductor layer 27. The stacked semiconductor layer 27 includes a first cladding layer 31, a core layer 33, and a second cladding layer 35. The first cladding layer 31, the core layer 33, and the second cladding layer 35 are disposed in that order in the direction of a normal axis of the principal surface 13a of the substrate 13. The optical waveguide 23 includes a core layer formed of a III-V group compound semiconductor.

When the coherent mixer includes the waveguide-type photodiodes 17a to 17d, the protective layer 25 covers the waveguide-type photodiodes 17a to 17d. Each of the waveguide-type photodiodes 17a to 17d includes a light-receiving layer formed of a III-V group compound semiconductor.

In this method, when the coherent mixer 11 has a structure in which at least a portion of the surface of the multi-mode interference device 15 is exposed at the opening 25a of the protective layer 25, it is possible for the evaluation characteristics of the coherent mixer 11 to approach a desired imbalance and a desired phase deviation.

Figure 13:
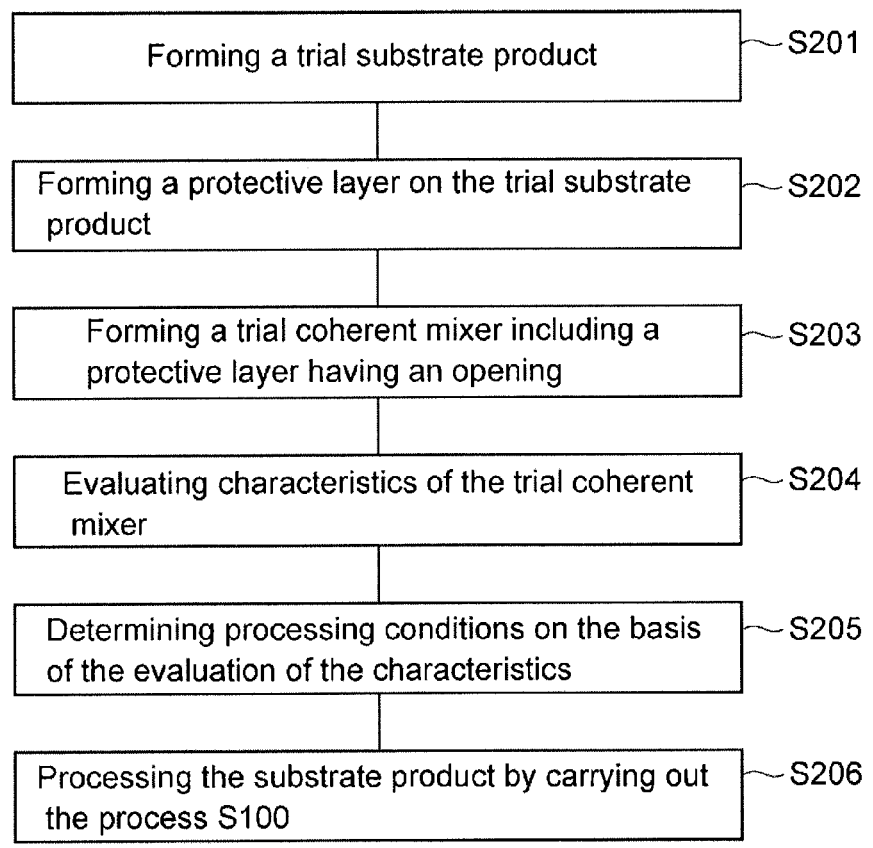
FIG. 13 shows the main steps of a method of manufacturing a coherent mixer.

FIG. 13 shows the main steps of a method of manufacturing a coherent mixer 11. In Step S201, a trial substrate product is provided. The trial substrate product includes a substrate 13 and a multi-mode interference device 15, and has a structure that is substantially the same as that of the substrate product. The trial substrate product may have a structure that differs from the structure of the substrate product within a range that does not influence the evaluation of the characteristics. A principal surface 13a of the substrate 13 includes a first area 13b and a second area 13c. The multi-mode interference device 15 is provided on the first area 13b of the substrate 13, and is formed of a III-V group compound semiconductor. A multi-mode interference device including at least one of a MMI type 90° hybrid and a coupler type 90° hybrid is applied to the coherent mixer 11. These structures may be formed by carrying out the steps of the method of manufacturing a semiconductor device related to a compound semiconductor (using, for example, an epitaxial growth device, a photolithography-and-etching device, and a CVD device for an insulating layer). If necessary, the substrate product may include a light-receiving device 17.

In Step S202, a protective layer is formed on an entire surface of the trial substrate product. In Step S203, a portion of the protective layer is removed by processing the protective layer, to manufacture the trial coherent mixer including the processed protective layer. The protective layer is processed by, for example, etching. In Step S204, the characteristics of the trial coherent mixer that has been manufactured are evaluated. In Step S205, processing conditions are determined on the basis of the evaluation of the characteristics. In Step S206, the coherent mixer 11 is manufactured using the substrate product by carrying out the process S100. In manufacturing the coherent mixer 11, in the step of forming a protective layer (Step S104), an opening is formed by processing the protective layer in accordance with, for example, the method of depositing an insulating layer, the thickness of the insulating layer, the material of insulating layer, the size of the opening, and the position of the opening, which are determined on the basis of the aforementioned evaluation of the characteristics. In the method of manufacturing the coherent mixer 11, the opening is formed by processing the protective layer of the coherent mixer on the basis of the evaluation of the characteristics of the trial coherent mixer. This makes it possible to provide a coherent mixer whose variations in imbalance and phase deviation are adjusted considering the influence of the protective layer. As a result, the coherent mixer having a desired imbalance value and a desired phase deviation value is obtained.

Figure 14:
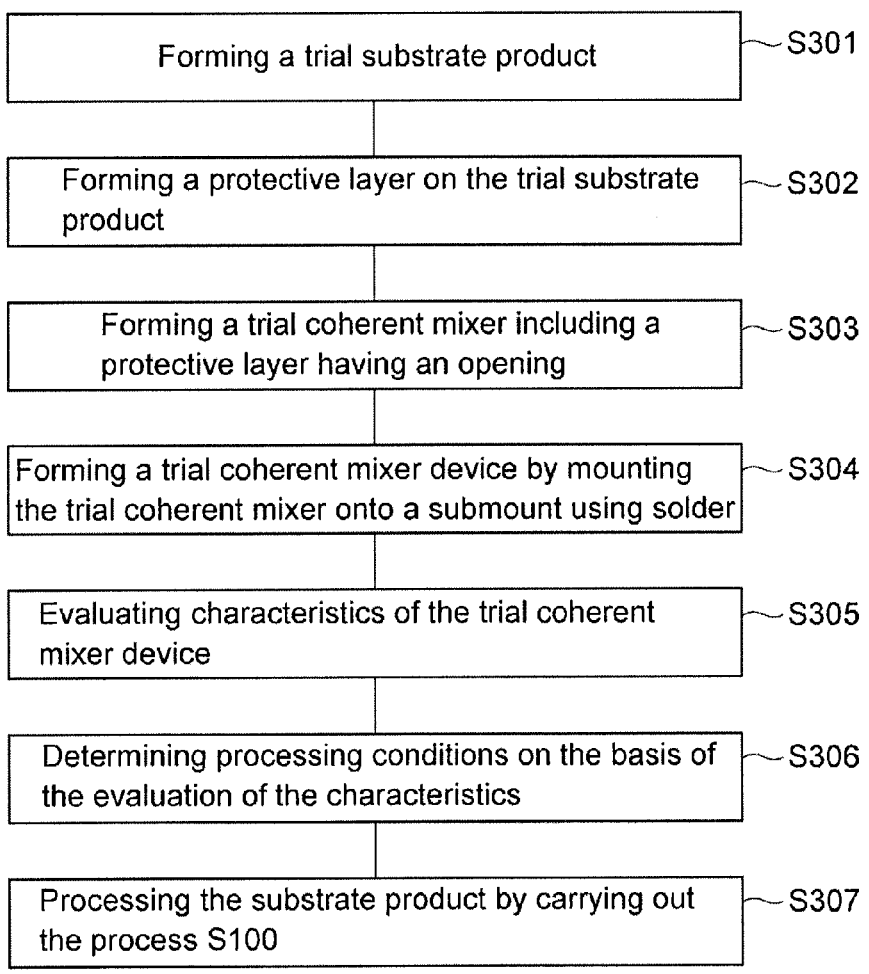
FIG. 14 shows the main steps of a method of manufacturing a coherent mixer.

FIG. 14 shows the main steps of a method of manufacturing a coherent mixer device. In Step S301, a trial substrate product is provided. The trial substrate product includes a substrate 13 and a multi-mode interference device 15, and has a structure that is substantially the same as that of the substrate product. The trial substrate product may have a structure that differs from the structure of the substrate product within a range that does not influence the evaluation of the characteristics. A multi-mode interference device including at least one of a MMI type 90° hybrid and a coupler type 90° hybrid is applied to the coherent mixer 11. These structures may be formed by carrying out the steps of the method of manufacturing a semiconductor device related to a compound semiconductor (such as an epitaxial growth step, a photolithography step, an etching step, and a CVD step for an insulating layer). If necessary, the substrate product may include a light-receiving device 17.

In Step S302, a protective layer is formed on an entire surface of the trial substrate product. In Step S303, a portion of the protective layer is removed by processing the protective layer, to manufacture a trial coherent mixer including the processed protective layer. The protective layer is processed by, for example, etching. In Step S304, the trial coherent mixer is mounted onto a submount using solder, to manufacture a trial coherent mixer device. In Step S305, the characteristics of the trial coherent mixer device that has been manufactured are evaluated. In Step S306, processing conditions are determined on the basis of the evaluation of the characteristics. In Step S307, the coherent mixer 11 is manufactured using the substrate product by carrying out the process S100. In manufacturing the coherent mixer 11, in the step of forming a protective layer, an opening is formed by processing the protective layer in accordance with, for example, the method of depositing an insulating layer, the thickness of the insulating layer, the material of insulating layer, the size of the opening, and the position of the opening, which are determined on the basis of the aforementioned evaluation of the characteristics. The coherent mixer is mounted in accordance with mounting conditions that have been determined in accordance with trial mounting conditions. In the method of manufacturing the coherent mixer device, the opening is formed by processing the protective layer of the coherent mixer device on the basis of the evaluation of the characteristics of the trial coherent mixer. This makes it possible to provide a coherent mixer device whose variations in imbalance and phase deviation are adjusted considering the influence of the protective layer. As a result, the coherent mixer device having a desired imbalance value and a desired phase deviation value is obtained.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:
1. A coherent mixer comprising:
   a substrate including a principal surface, the principal surface having a first area and a second area;
   a multi-mode interference device provided on the first area of the substrate;
   a light-receiving device provided on the second area of the substrate, the light-receiving device including a plurality of waveguide-type photodiodes;
   a first input waveguide optically coupled to the multi-mode interference device;
   a second input waveguide optically coupled to the multi-mode interference device;

a plurality of optical waveguides optically coupling the multi-mode interference device to the plurality of waveguide-type photodiodes; and a protective layer on the first and second areas of the substrate, the protective layer covering the plurality of waveguide-type photodiodes, wherein the substrate, the multi-mode interference device, and the light receiving device provide a substrate product, the protective layer is disposed in contact with a surface of the substrate product and has an opening in the first area of the substrate, and the multi-mode interference device has a surface that is at least partially exposed at the opening of the protective layer.

2. The coherent mixer according to claim 1, wherein the multi-mode interference device includes a first cladding layer, a core layer, and a second cladding layer that are disposed in that order in a direction normal to the principal surface of the substrate, the optical waveguides, the first input waveguide, and the second input waveguide include the core layer disposed between the first cladding layer and the second cladding layer, and the waveguide-type photodiodes include a light-receiving layer.

3. The coherent mixer according to claim 2, wherein the core layer is formed of indium gallium arsenide phosphide, and the light-receiving layer of the waveguide-type photodiodes is formed of indium gallium arsenide.

4. The coherent mixer according to claim 1, wherein the multi-mode interference device includes a multi-mode interference type 90° hybrid.

5. The coherent mixer according to claim 1, wherein the multi-mode interference device includes a multi-mode interference type 90° hybrid, and the multi-mode interference type 90° hybrid has a top surface and a side surface that are at least partially exposed at the opening of the protective layer.

6. The coherent mixer according to claim 1, wherein the multi-mode interference device includes a multi-mode interference type 90° hybrid, and the multi-mode interference type 90° hybrid includes a multi-mode interference coupler having two input ports that are connected to the first input waveguide and the second input waveguide, respectively, and four output ports that are connected to the plurality of optical waveguides, respectively.

7. The coherent mixer according to claim 1, wherein the surface of the multi-mode interference device is entirely exposed at the opening of the protective layer.

8. The coherent mixer according to claim 1, wherein the multi-mode interference device includes a coupler type 90° hybrid, the plurality of optical waveguides include a first optical waveguide, a second optical waveguide, a third optical waveguide, and a fourth optical waveguide, the coupler type 90° hybrid includes a first multi-mode interference coupler that is connected to the first input waveguide, a second multi-mode interference coupler that is connected to the second input waveguide, a third multi-mode interference coupler that is connected to the first multi-mode interference coupler through a first connecting waveguide and to the second multi-mode interference coupler through a second connecting waveguide, and a fourth multi-mode interference coupler that is connected to the first multi-mode interference coupler through a third connecting waveguide and to the second multi-mode interference coupler through a fourth connecting waveguide, the third multi-mode interference coupler is connected to the light-receiving device through the first and second optical waveguides, the fourth multi-mode interference coupler is connected to the light-receiving device through the third and fourth optical waveguides, and at least one of the first multi-mode interference coupler, the second multi-mode interference coupler, the third multi-mode interference coupler, and the fourth multi-mode coupler is exposed at the opening of the protective layer.

9. The coherent mixer according to claim 8, wherein one of the first multi-mode interference coupler, the second multi-mode interference coupler, the third multi-mode interference coupler, and the fourth multi-mode interference coupler is covered by the protective layer.

10. The coherent mixer according to claim 1, wherein the protective layer is formed of silicon nitride, and the substrate includes a semi-insulating indium phosphide.

11. A coherent mixer comprising:

a substrate product including:

a substrate including a principal surface;

a multi-mode interference device provided on the principal surface of the substrate;

a first input waveguide optically coupled to the multi-mode interference device;

a second input waveguide optically coupled to the multi-mode interference device; and a plurality of optical waveguides optically coupled to the multi-mode interference device; and a protective layer disposed on the substrate in contact with a Surface of the substrate product, wherein the protective layer has an opening, and the multi-mode interference device has a surface that is at least partially exposed at the opening of the protective layer.

12. The coherent mixer according to claim 11, wherein the multi-mode interference device includes a first cladding layer, a core layer, and a second cladding layer that are disposed in that order in a direction normal to the principal surface of the substrate, and the optical waveguides, the first input waveguide, and the second input waveguide include the core layer disposed between the first cladding layer and the second cladding layer.

13. The coherent mixer according to claim 1, wherein the protective layer is formed of a silicon based inorganic insulator layer or a resin layer.

14. The coherent mixer according to claim 13, wherein the silicon based inorganic insulator layer includes one of silicon nitride, silicon oxynitride and silicon dioxide.

15. The coherent mixer according to claim 13, wherein the resin layer includes one of a polyimide resin and a benzocyclobutene resin.

* * * * *